Patented June 26, 1951

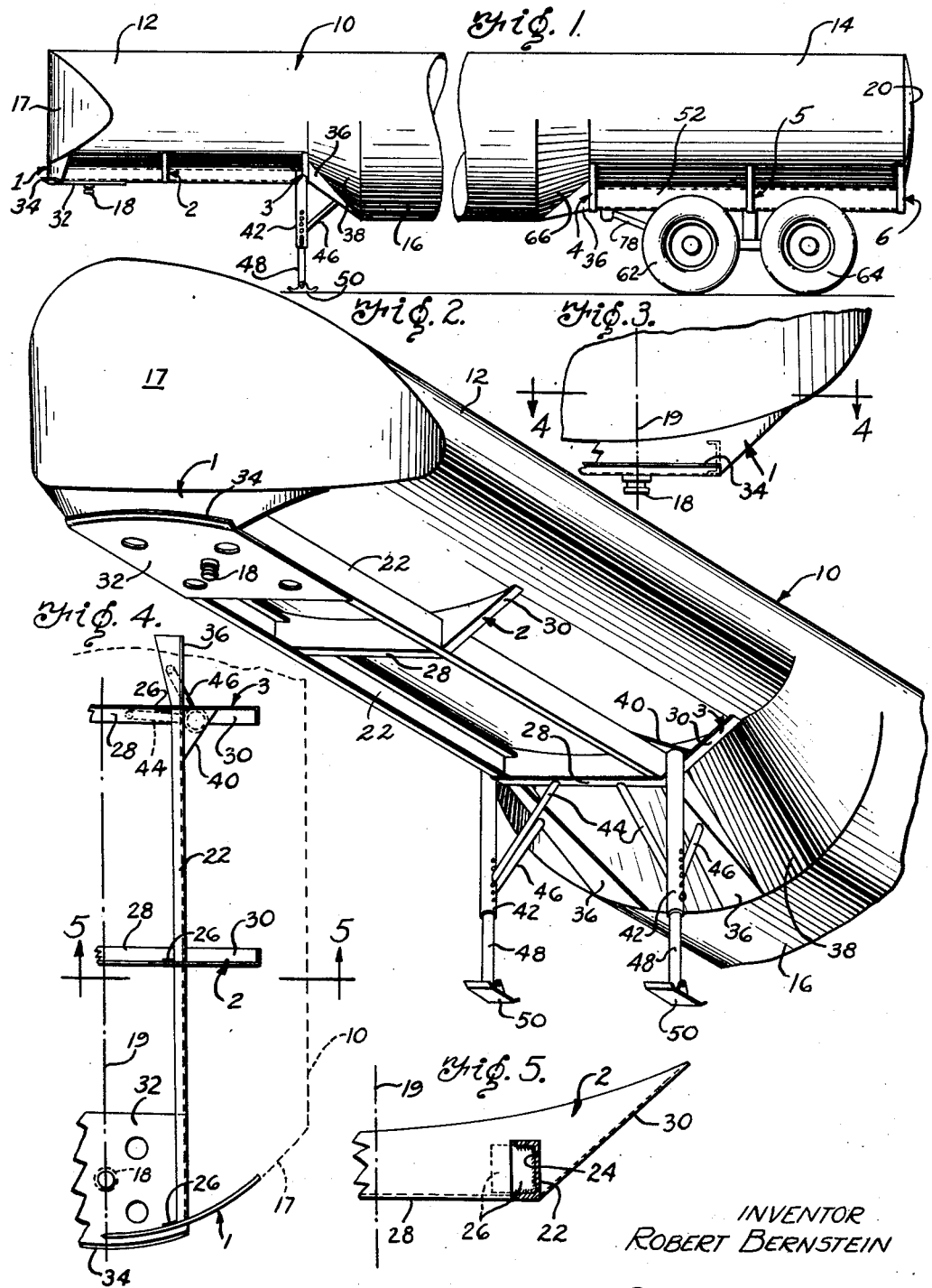

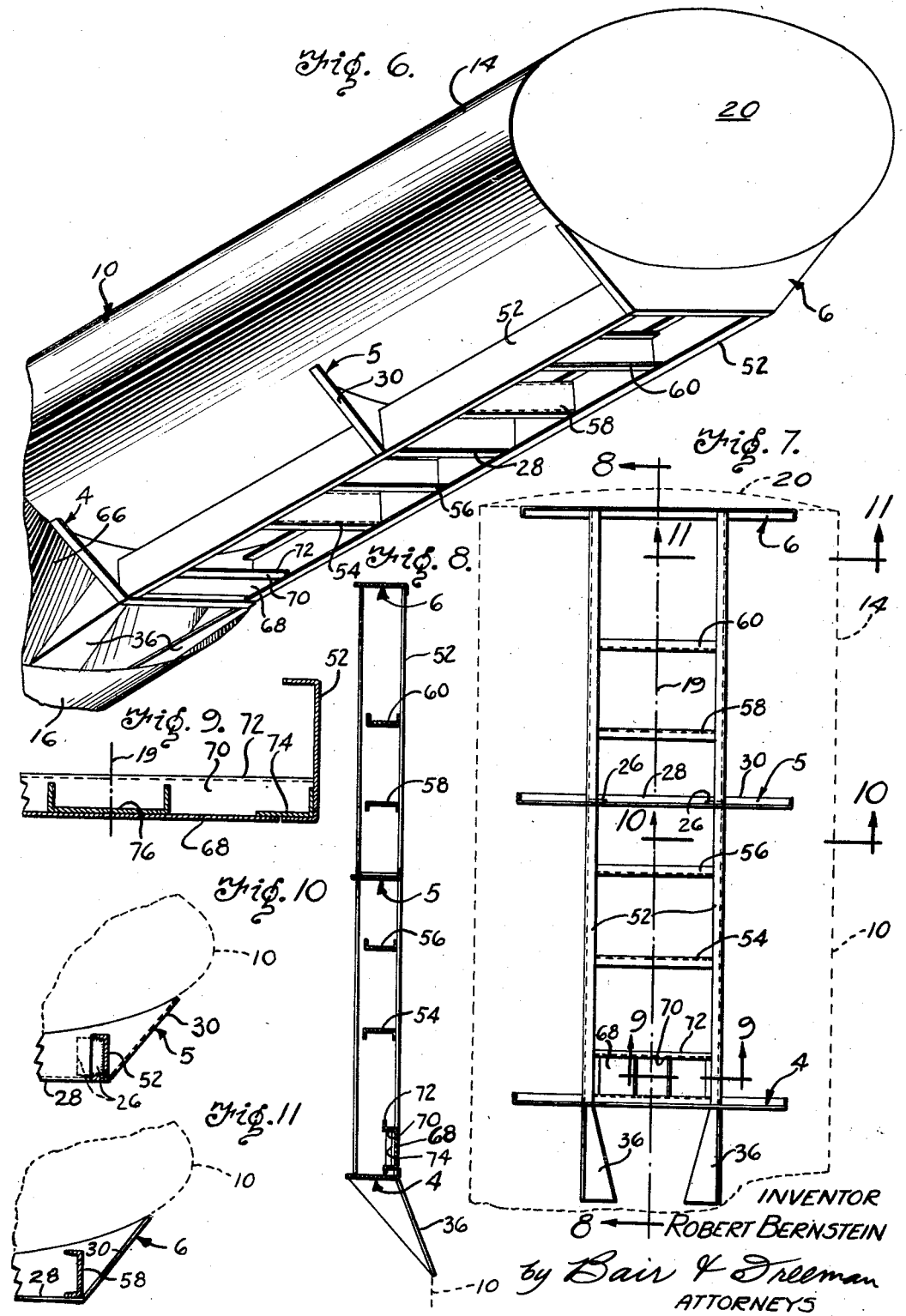

2,558,168

UNITED STATES PATENT OFFICE 2,558,168

MOUNTING FOR DOUBLE DROP TRAILER TANKS

Robert Bernstein, Omaha, Nebr.

Application February 20, 1947, Serial No. 729,800

5 Claims. (Cl. 280—5)

This invention relates to a means for mounting a double drop trailer tank of the kind shown in my copending Design application, Serial No. D. 131,809, filed July 22, 1946, and issued as Patent No. D. 150,399, dated August 3, 1948, on a trailer truck at the front of the trailer tank and on supporting wheels at the rear of the tank.

One object of the invention is to provide front and rear frames fabricated of steel shapes welded together, and welded to the ends of a trailer tank for supporting gasoline, oil and other liquids, the center portion of the tank being larger in diameter than the end portions and the enlarged center portion being entirely on the underside whereby the top of the tank is a straight line.

Another object is to provide fabricated sub-frames, one for the front of the trailer tank having a king-pin mounted thereon and mountings for supporting posts when the trailer truck is disconnected from the trailer itself, the other sub-frame being for the rear of the trailer tank and including cross members suitable for mounting the springs of rear axles thereon and radius rods or other braces.

Still another object is to provide mounting means for a trailer tank of the kind that has a drop portion wherein the mounting is in the form of longitudinal rails with bolsters connecting the rails together, and the bolsters being so shaped as to fit the contour of the tank and being welded thereto.

A further object is to provide gusset connections from one end of each sub-frame to the drop portion of the tank whereby the sub-frames and drop portion mutually reinforce each other.

Still a further object is to provide sub-frame structures, the parts of which are readily fabricated from steel shapes and formed from steel plates, and which can be assembled in relation to each other and welded together in a minimum amount of time, thus providing a trailer tank structure that can be manufactured at a minimum cost.

With these and other objects in view, my invention consists in the construction, arrangement and combination of the various parts of my device whereby the objects contemplated are attained as hereinafter more fully set forth, pointed out in my claims and illustrated in the accompanying drawing, wherein:

Figure 1 is a side elevation of a double drop trailer tank with my mounting means applied thereto.

Figure 2 is an underside perspective view of the front end of the tank showing details of the mounting.

Figure 3 is a front elevation of one corner of the tank and mounting.

Figure 4 is a plan view of substantially one-half of the front sub-frame, taken on the line 4—4 of Figure 3, showing in dotted lines the relation of the tank thereto.

Figure 5 is a sectional view on the line 5—5 of Figure 4.

Figure 6 is an underside perspective view of the rear end of the trailer tank with the rear sub-frame mounted thereon, and discloses details of the sub-frame.

Figure 7 is a plan view of the rear sub-frame with the relation of the trailer tank thereto indicated by dotted lines.

Figure 8 is a longitudinal sectional view on the line 8—8 of Figure 7.

Figure 9 is an elongated sectional view on the line 9—9 of Figure 7.

Figure 10 is a sectional view on the line 10—10 of Figure 7, and

Figure 11 is a sectional view on the line 11—11 of Figure 7.

On the accompanying drawings I have used the reference numeral 10 to indicate in general a trailer tank. The tank 10 is elliptical in cross section with a front end section 12 and a rear end section 14. The sections 12 and 14 are less in size than a center or drop portion 16 of the tank. The front end of the tank 10 indicated at 17 is curved on a radius about the axis of a king-pin 18 to provide clearance for swinging of the trailer tank in relation to the trailer truck when turning corners.

The rear wall of the tank 10 indicated at 20 is preferably convex for maximum strength. The tank 10, of course, may be made of steel, aluminum or any other suitable sheet metal with the various portions thereof welded, brazed or otherwise suitably connected together.

For the front portion 12 of the trailer tank 10, I provide a sub-frame comprising a pair of channel shaped rails 22 and bolsters numbered 1, 2 and 3. The bolster 1 is merely a vertical plate, and curved in plan view as shown in Figure 4. The plate is cut to the front elevational shape shown in Figure 5 wherein approximately one-half of the bolster 2 is shown and the center line is indicated at 19. The bolster plate 2 has a rectangular notch 24 formed therein to receive each rail 22. The rail is welded in position and a rectangular filler plate 26 is thereafter welded into the channel and against the rear face of the plate 2 to fill the opening in the channel between its flanges.

The front end of each channel 22 is welded against the rear surface of the curved plate that constitutes bolster 1. Bolster 2 differs from bolster 1 in that it has a flange 28 along its lower edge and a flange 30 along its inclined edge. Similarly bolster 3 has the flanges 28 and 30. It doesn't have the notch 24 however, as the rear ends of the rails 22 are welded to its front surface.

The upper edges of the plate forming bolster 1 and the upper edges of bolsters 2 and 3 are welded to the tank portion 12. A king-pin plate 32 is welded to the lower flanges of the rails 22 adjacent their forward ends. The king-pin 18 is welded to the center of this plate and may coact with the usual king-pin socket of a trailer truck. The forward edge of the king-pin plate is cut on a curve as shown in Figure 4 and its marginal edge is turned up slightly as indicated at 34 for the purpose of facilitating coaction of the king-pin plate and the king-pin with the platform of the trailer truck that has the king-pin socket mounted thereon.

At the rear end of the front sub-frame a pair of gusset plates 36 are provided having vertical and horizontal flanges each of which is substantially triangular in shape. The upper edges of the vertical flanges are welded to the inclined portion of the tank 10 which is indicated at 38, and the rear edges of the gusset plates are welded to the tank at the front end of the drop portion 16.

Triangular supporting plates 40 are welded to the rails 22 and the bolster 3 and vertical tubular posts 42 have their upper ends welded to the plates 40. The posts are braced by steel tubes 44 and 46 welded in position, and telescopically receive posts 48 which terminate in supporting shoes 50.

The rear sub-frame comprises a pair of rails 52 which like the rails 22 are channel shaped. Bolsters 4, 5 and 6 are provided comprising flat plates with flanges 28 and 30 similar to the plates that form the bolsters 2 and 3. The bolster 5 is notched, the same as the bolster 2 at 24 in Figure 5, to receive the channels 52, and filler plates 26 are provided the same as in Figure 5. The front and rear ends of the rails 52 are welded to the rear and front surfaces of the bolsters 4 and 6, respectively, in the manner already described for bolster 3. The upper edges of the bolster plates 4, 5 and 6 are welded to the rear section 14 of the trailer tank 10.

Additional cross braces are provided between the rails 52 in the form of channels 54, 56 and 58 and 60. The channels 54 and 56 are provided for supporting in any suitable manner the springs and axle of a pair of forward wheels 62 shown in Figure 1. Similarly the channels 58 and 60 are provided for rear wheels 64.

At the forward end of the rear sub-frame gusset plates 36 similar to those at the rear end of the front sub-frame are provided and these are welded to the slanting portion 66 of the tank in the same manner that the front gussets are welded to the slanted portion 38. A cross frame reinforcement is also provided adjacent these gusset plates in the form of a bottom plate 68 extending from the bolster 4 rearwardly and having a vertical flange 70 along its rear edge and terminating in a horizontal flange 72. This is reinforced by angle bars 74 welded to the rails 52 and to each end of the plate 68 as shown in Figure 9 and by a fore and aft extending channel member 76 also welded in position. The elements 68 and 76 are adapted for the attachment of radius rods 78 or other suitable brace rods for the axles of the wheels 62 and 64.

From the construction of the mounting means herein described, it will be obvious that a rigid sub-frame is provided for each end of a trailer or transport tank and particularly that type of tank which has a drop center. The sub-frames and the tank mutually reinforce each other and the sub-frames provide an effective support for one end of the tank in respect to a trailer truck, and for the other end in respect to supporting wheels attached directly to the rear sub-frame. The drop portion of the tank provides greater capacity without increasing the overall height as the drop portion is entirely in the lower half of the tank. This brings the center of gravity closer to the ground yet there is no interference with supporting means for the trailer tank because the supports are only at the end sections 12 and 14 of the tank. The entire structure is readily fabricated from steel plates and channels by a welding process which makes for a cheap yet sturdy and serviceable finished structure.

Some changes may be made in the construction and arrangement of the parts of my device without departing from the real spirit and purpose of my invention, and it is my intention to cover by my claims such modified forms of structure or use of mechanical equivalents as may be reasonably included within their scope.

I claim as my invention:

1. In a trailer tank of the character disclosed, said tank comprising a center section and a pair of end sections, said end sections being of less diameter vertically than said center section and the top of all three sections being coincident, transition sections between the small diameter end sections and the large diameter center section, structural framing along the exterior of the bottom of the tank beneath only the end sections, said structural framing comprising a sub-frame for each of said end sections, each sub-frame comprising a pair of rails, bolster plates arranged laterally thereof and secured to the rails and the tank, and gusset plates secured to the rear end of the front sub-frame and to the front end of the rear sub-frame, said gusset plates extending respectively downwardly and rearwardly, and downwardly and forwardly, said gusset plates each having a vertical flange and a horizontal flange secured to said transition sections, and said sub-frames and gusset plates being all disposed entirely above the bottom surface of said center section.

2. In a transport tank, said tank comprising a center section and a pair of end sections, structural framing along the exterior of the bottom of the tank beneath only the end sections, said structural framing comprising a sub-frame for each of said end sections, each sub-frame comprising a pair of rails, and bolster plates arranged laterally thereof and welded to the rails and to the tank, gusset plates secured to the rear end of the front sub-frame and to the front end of the rear sub-frame, said gusset plates extending respectively rearwardly and forwardly to said center section of said tank, each gusset plate having a vertical flange and a horizontal flange secured to said center section, said gusset plates being disposed entirely above the bottom surface of said center section, a king-pin plate welded on the front end of the front sub-frame, and means on said rear sub-frame for supporting it on wheels.

3. In combination with a transport tank having a drop center section, and front and rear end sections, structural framing along the exterior of the bottom of the tank beneath only the end sections, said structural framing comprising a sub-frame for each of said front and rear end sections, each sub-frame comprising rails, and bolsters welded together and to said end sections, gusset plate connections from the ends of said center section to the adjacent ends of said sub-frames, said sub-frames and gusset plate connections being all disposed entirely above the bottom surface of said center section.

4. In combination with a transport tank having front and rear sections, mounting means comprising a sub-frame for each of said sections, each sub-section comprising a pair of transversely spaced longitudinal rails, a plurality of longitudinally spaced transverse bolster plates having their surfaces welded to the ends of said rails, and the intermediate bolster plates having openings receiving said rails and being welded to said rails, said bolster plates being secured to the tank.

5. In combination with a transport tank having front and rear sections, mounting means comprising a sub-frame for each of said sections, each sub-section comprising a pair of transversely spaced longitudinal channel shape rails, a plurality of longitudinally spaced transverse bolster plates having their surfaces welded to the ends of said rails, and the intermediate bolster plates having openings receiving said rails and being welded to said rails, filler plates in said rails and welded to said intermediate bolster plates, said bolster plates being secured to the tank.

ROBERT BERNSTEIN.

REFERENCES CITED

The following references are of record in the file of this patent:

UNITED STATES PATENTS

| Number | Name | Date |
| --- | --- | --- |
| Re. 2,031 | Keeler | July 18, 1865 |
| | (Original No. 45,834) | |
| 2,056,820 | Bradley et al. | Oct. 6, 1936 |
| 2,061,117 | Thwaits | Nov. 17, 1936 |
| 2,098,522 | Simning | Nov. 9, 1937 |
| 2,113,796 | Meyer | Apr. 12, 1938 |
| 2,239,442 | Gredell | Apr. 22, 1941 |